United States Patent
Tong

[15] 3,659,941
[45] May 2, 1972

[54] INFRA-RED SPECTROMETERS

[72] Inventor: Mathias Tong, Courbevoie, France

[73] Assignee: Compagnie D'Applications Mecaniques A L'Electronique, Au Cinema Et A L'Atomistique (C.A.M.E.C.A.)

[22] Filed: July 9, 1970

[21] Appl. No.: 53,516

[30] Foreign Application Priority Data

July 21, 1969 France..................................6924739

[52] U.S. Cl......................356/51, 250/83.3 H, 250/220 SD, 356/88, 356/95, 356/97
[51] Int. Cl..........................................................G01j 3/42
[58] Field of Search..........................356/51, 81, 88, 93–98, 356/201, 205; 250/43.5, 83.3 H, 218, 220 SD, 226

[56] References Cited

UNITED STATES PATENTS 3,102,921 9/1963 Peras.....................................356/81 X
3,428,401 2/1969 Buzza....................................356/81 X Primary Examiner—Ronald L. Wibert
Assistant Examiner—F. L. Evans
Attorney—Kurt Kelman

[57] ABSTRACT

In a two-channel spectrometer, the output signal of the optico-electrical detector is integrated, while one of the two channels is illuminated, for a duration $T_o$ at the end of which the integrated signals reaches a value E, one of the two values $T_o$ and E being predetermined; the output signal of the detector is thereafter integrated, while the other channel is illuminated, for a duration $T_1$ at the end of which the integrated signal reaches the aforesaid value E; $T_1/T_o$ is the transmission coefficient of the first channel relatively to the other one, and a signal function of $T_1/T_o$ is applied to the recorder.

5 Claims, 4 Drawing Figures

INVENTOR
MATIAS TONG
BY Kurt Kelman
AGENT

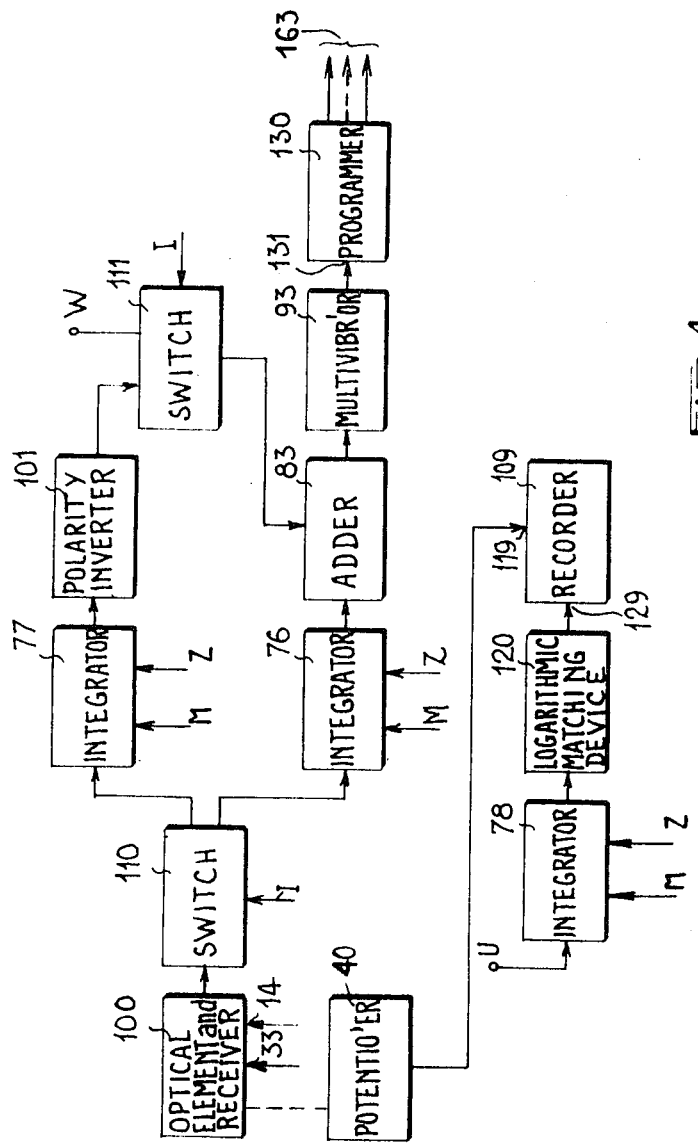

INFRA-RED SPECTROMETERS

The present invention relates to two-channel spectrometers.

Those skilled in the art will be aware that in two-channel spectrometers, a radiation detector is supplied with substantially monochromatic radiation transmitted alternately by two channels, one of which contains the sample which is being studied, and the other of which is a reference channel, possibly containing a reference body such as a solvent.

Whether it is desired to determine the coefficient of transmission, the optical density, or the reflection coefficient of the sample, it is ultimately always the transmission coefficients of the two channels which are compared.

Transfer from one channel to the other is effected by means of an optical switch.

The spectrometer in accordance with the invention is designed more particularly albeit not exclusively, for the study of the far infra-red.

Generally speaking, in two-channel spectrometers of known type, the optical switch is designed to change state at a fixed frequency, in other words the two channels are alternately supplied during equal times; switching is sufficiently rapid to ensure that by means of an appropriate design on the part of the electrical section of the receiver, the latter produces a signal proportional to the difference between the radiation intensity transmitted by the two channels; this signal controls the transmission coefficient of the reference channel by means of a variable attenuator whose attenuation coefficient, once a zero difference signal is reached, is directly related to the transmission coefficient of the sample channel.

Because of well known problems (low power of the available sources, within the far infra-red part of the spectrum, parasitic thermal fluxes superimposed upon the effective signal), recording of the precise spectrum within the far infra-red range takes up a substantial amount of time.

On the other hand, the design of a variable optical attenuator within the far infra-red, creates problems; firstly, thus far no substance is known which is capable of acting as a variable-density attenuator within a wide wavelength range; secondly, attenuators of the comb type can, given the wavelengths of the radiations involved, give rise to parasitic diffraction phenomena variable with the wavelength; finally, the signal-to-noise ratio is determined by the channel whose transmission coefficient is lower.

If an electrical attenuator is used instead of an optical attenuator, the two first-mentioned drawbacks are overcome but not the third. And, in so doing, another one is introduced, namely that at the output of the detector, two separate amplifier circuits have to be used; this falsifies the result in the event of any drift in these circuits because, generally speaking, the drifts do not compensate each other.

The present invention enables these drawbacks to be overcome by means of a spectrometer adapted for a measuring technique which, on the one hand, makes it possible to substantially reduce the total measurement time by making the ratio of the measurement times in the two channels (for each relevant section of the spectrum) a function of the ratio of their transmission coefficients, and on the other hand makes it possible to dispense with the use of a variable attenuator whilst retaining the advantage of automatic recording in the spectrum.

According to the invention, there is provided an infra-red spectrometer comprising: a source of radiation; an optico-electrical receiver having an output, for supplying an electrical signal which is a function of the intensity of the radiation received by said receiver; a sample channel for receiving a sample and a reference channel; optical switching means, having two states, for optically coupling, selectively through said sample channel or through said reference channel, said source to said receiver; a wavelength selector located for operating a wavelength selection on the beam directed from said source toward receiver for both states of said switching means; measurement means for successively (i) setting said optical switching means to one of its states referred to as its first state, for coupling said source to said receiver through one of said channels, referred to as the first measurement channel; (ii) integrating the output signal from said receiver for a duration $T_o$ at the end of which the integrated signal reaches a value E, one of the two quantities $T_o$ and E being predetermined, and generating and storing a signal representative of the other one of said two quantities; (iii) setting said optical switching means to its other state, referred to as its second state, for coupling said source to said receiver through the other one of said channels, referred to as the second measurement channel, and (iiii) integrating the output signal from said receiver for the duration $T_1$ at the end of which the corresponding integrated signal has reached said value E, and generating a signal proportional to said duration $T_1$; and further means coupled to said measurement means, for supplying an input of a recorder with a signal which is a predetermined function of the ratio $T_1/T_o$.

The term "two-position integrator" is used to describe an integrator having a measurement position in which it integrates the signal applied to its "signal input" or "integration input," and a storage or memory position in which, if not reset to zero, it stores the last value of the integrated signal which it supplied in the measurement position.

A device comprising a measurement position in respect of which it produces an electrical signal which is a function of the time elapsed since it was placed in this position, and a storage or memory position in respect of which, if not reset to zero, it stores the memory of the last electrical time signal which it supplied in the measurement position, is termed a "two-position time measurement device." A time measurement device of this kind can be constituted in particular by an integrator supplied with a constant voltage, or again by a counter supplied with pulses of constant frequency.

The invention will be better understood from a consideration of the ensuing description and the accompanying drawings in which:

FIG. 1 schematically illustrates a general embodiment of a spectrometer in accordance with the invention.

FIG. 4 illustrates a detailed embodiment of the electrical circuits of the spectrometer of FIG. 1, in the case where $T_o$ = constant.

First of all, the practical significance of the method described will be justified.

Let K be the ratio $K_o/K_1$ of the transmission coefficients $K_o$ and $K_1$ of the first and second measurement channels.

It is evident that it is desirable to achieve results which, for an error $$\left|\frac{\Delta K}{K}\right|$$

less than a given limit $\epsilon$:

a. are produced in the shortest possible time; and b. are produced using an apparatus which is both technologically possible and whose degree of complexity is not prohibitive.

In conventional spectrometers, the times of illumination of the two channels are equal.

Theoretical considerations indicate that if the result (a) is to be obtained, one ends up with conditions which are difficult to satisfy and which depend upon the detailed structure of the spectrometer.

However, experience indicates that in a general manner the total time of a measurement can be improved for the same accuracy, by arranging that for each cycle the ratio of the measurement times in the two channels is equal to the reciprocal of the ratio of the transmission coefficients of said channels. On the other hand, this is something which can easily be realized from the technical point of view, by integrating the signal of each channel respectively during two times $T_o$ and $T_1$ at the end of which the value of the integrated signal is the same, E, in both cases.

Thus, obviously: $K = K_o/K_1 = T_1/T_o$.

In order to fully determine the two times $T_o$ and $T_1$ within preferred terms, the condition E = constant should be satisfied, meaning in other words that the time should be selected which is inversely proportional to the transmission coefficient of the channel in question, and to the radiation intensity produced by the source at each wavelength.

In another embodiment of the method, which leads to simplification of the circuits, the condition is simply that $T_o$ = constant.

Figure 1:
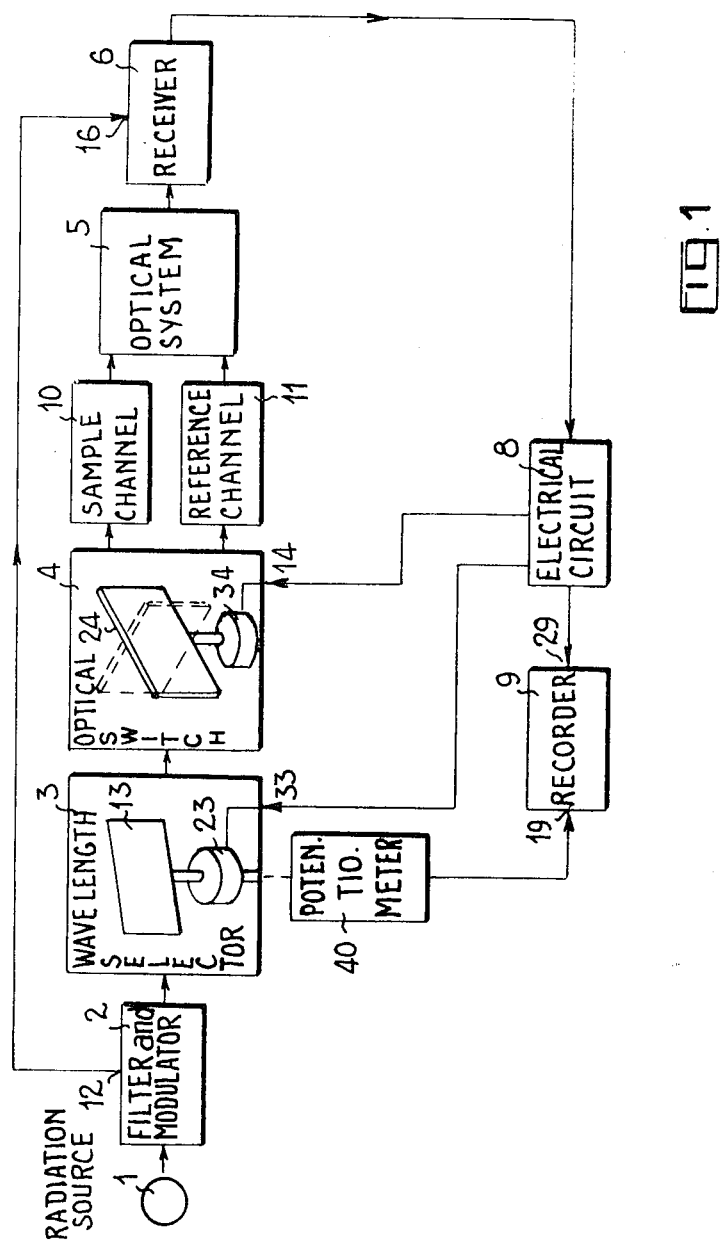

In FIG. 1, a general diagram of a spectrometer with automatic recording of the spectrum, has been illustrated, said spectrometer being intended for being operated with E = constant or $T_o$ = constant according to the design of the electrical circuit 8 included therein.

In FIG. 1, the radiation produced by the radiation source 1, is transmitted to a device 2 comprising on the one hand and in a conventional way, a low-pass preliminary filter for the incident beam, and on the other hand an all-or-nothing modulator or chopper for said radiation, for example a slotted disc, plus circuits for generating an electrical reference signal synchronized with the rotational movement of the modulator, this signal being supplied at the electrical output 12 of the device 2.

The preliminarily filtered and modulated optical flux produced by the optical output of the device 2, is supplied to a device 3 producing the monochromatic light, in other words a wavelength selector or "monochromator," the grating 13 of which has been shown, this being rotatable about an axis parallel to the grating lines and being driven by an electromechanical device 23 comprising for example, a synchronous motor followed by a step-down gearing arrangement, said motor being controlled by a signal applied to the electrical input 33 of the monochromator. A pick-up potentiometer 40 mechanically connected to the device 23 produces an electrical signal X which is a function of the angular position of the grating.

The monochromatic radiation coming from the monochromator 3 is applied to an optical switching device 4 which enables it to be directed alternately to the first and second measurement channels 10 and 11, one of which contains a sample and the other of which does duty as the reference channel.

It has been assumed that the moving element of the switch is a two-position mirror 24, illustrated inside the block 4 in full line in one of its two rest positions, and in broken line in its second rest position, these positions corresponding respectively to illumination of the channels 10 and 11.

The position of the mirror 24 is controlled by an electromechanical device 34 through the medium of a system of stops which has not been shown in the Figure. The device 34 is itself controlled by an electrical signal applied to the electrical input 14 of the device 4.

Finally, the output radiation beams from the two channels are directed to the optical input of the receiver 6 through an optical device 5. The receiver 6 comprises an optico-electrical detector and a synchronous detector, said receiver being supplied at its input 16 with the reference signal coming from the electrical output 12 of the device 2.

Each of the elements making up that part of the spectrometer which has just been described, is a conventional one and requires no further detailed description here.

The receiver 6 supplies a circuit 8 comprising at least one two-position integrator whose input is coupled to the output of the receiver 6. The circuit 8 controls the position of the mirror 24 (through the input 14 of device 4) and that of the grating 13 (through the input 33 of device 3). On the other hand, it supplies to the second input 29 of a recorder 9, a signal which is a function of the ratio of the transmission coefficients of the two channels for each position of the grating.

The recorder 9 is supplied on the other hand, at its input 19, with the signal X which is a function of the position of the grating as determined by the pick-up potentiometer 40.

Figure 2:
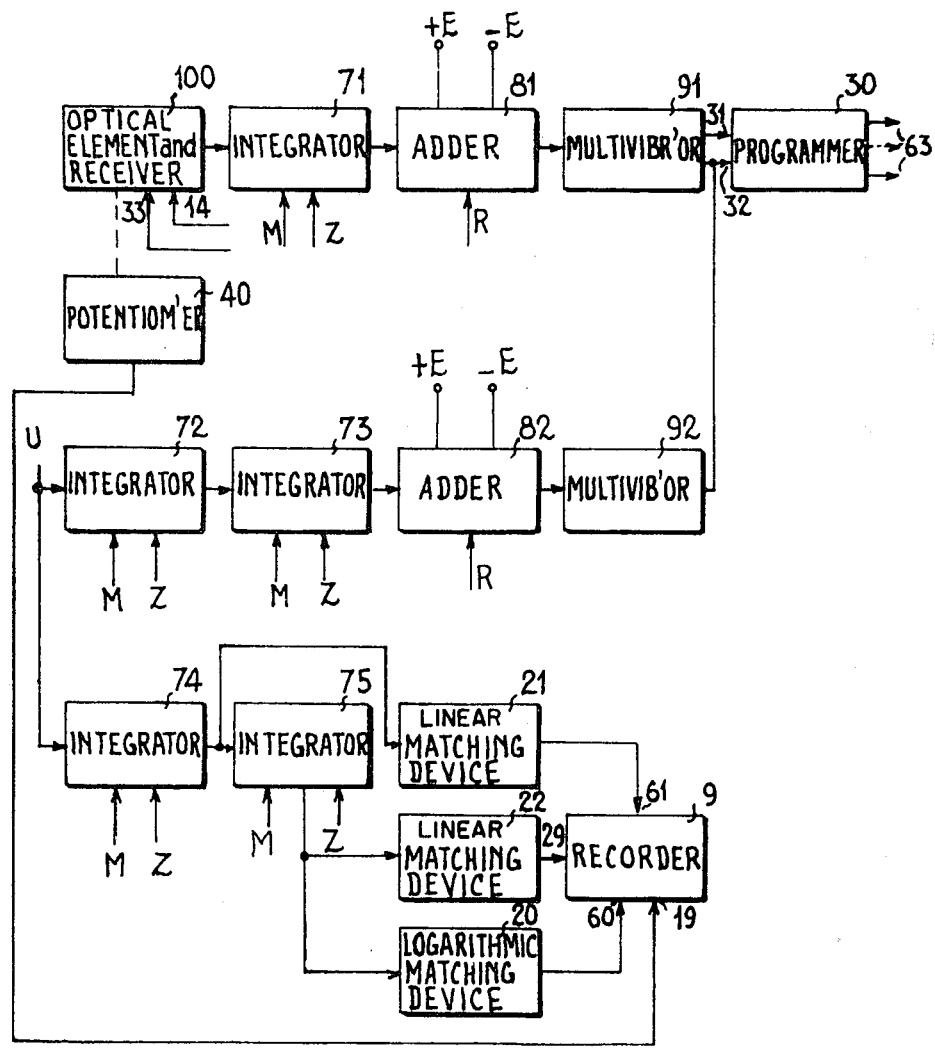
FIG. 2 illustrates a detailed embodiment of the electrical circuits of the spectrometer of FIG. 1, in the case where E = constant.

FIG. 2 illustrates an embodiment of the circuits 8 for the case where E is constant at least for the whole of the duration of a recording operation. In this Figure, the block 100 represents the optical elements and the receiver 6 shown in FIG. 1, from the source 1 to the receiver 6, with the control inputs 33 and 14, said block feeding in turn a two-position integrator 71 through its electrical output, and the pick-up potentiometer 40 through its mechanical output.

The circuit 8 comprises four further two-position integrators 72 to 75, and two variable-structure adders 81 and 82 each with a control input R.

Each of the five integrators comprises a control input Z enabling it to be reset to zero by establishing a discharge circuit for its integrating capacitor; the integrator will be referred to as being in the "resetting-to-zero" state when said connection is established, this disregardless of whether it has already been reset zero or otherwise. It furthermore comprises a control input M enabling it to be placed in the measurement or storage position by either maintaining or breaking the connection between its signal input or "integration input," and the other elements of the integrator.

The measurement position and the storage position assume of course that the capacitor is not in the resetting to zero state. On the other hand, resetting to zero is here always applied to an integrator which is decoupled from the element which supplies it in the measurement position, so that each of said three terms "measurement position," "storage position" and "resetting-to-zero" state fully defines the state of an integrator as far as the connections controlled by its inputs M and Z are concerned. These integrators may be of the Miller type.

The circuit 8 comprises a programmer 30 which is supplied at its inputs 31 and 32 with information coming from the remainder of the circuit.

The programmer 30 supplies the inputs 33 and 14 of the block 100, the control inputs M and Z of the integrators 71 to 75, and those R of the adders 81 and 82, through a plurality of outputs 63.

The assembly of these latter outputs has been indicated by two full-line arrows and a single broken-line one; in order to make the Figure clearer, the corresponding connections have not been shown.

The circuit 8 which comprises in particular the aforementioned elements, is constituted as follows:

The output of the integrator 71 supplies the first input of the adder 81 whose second input is supplied with the fixed voltage − E, its third input being supplied with the voltage + E.

The output of the adder 81 supplies the control input of a bistable multivibrator 91 whose output is connected to the input 31 of the programmer 30. A fixed voltage source U is connected to the integration input of the integrator 72, the latter's output being connected to the integration input of the integrator 73. The output of the latter, in turn, supplies the first input of the adder 82 which is supplied at its second input with the fixed voltage − E and at its third input with the voltage + E. The output of the adder 82 supplies the control input of a bistable multivibrator 92 whose output is connected to the input 32 of the programmer 30.

Each of the adders 81 and 82 comprises a control input R by means of which the connection of its output with its third input can be maintained or broken, the adder being referred to as occupying the "1" state in the first case, and occupying the "0" state in the second case. In the "0" state, the adder carries out the operation $$\frac{x + (-E)}{2} = \frac{x - E}{2}$$

where $x$ is the voltage applied to its first input. In the "1" state, it carries out the operation:

$$\frac{x + (-E) + 2(+E)}{4} = \frac{x + E}{4}$$

and accordingly produces a positive signal if, as is the case here, $x$ can only be positive or zero.

Each of the multivibrators 91 and 92 is placed in its "1" state if it did not already occupy said state, by a negative signal of sufficient amplitude applied to its control input. It triggers into its "0" state as soon as the signal applied to its control input ceases to be negative.

The voltage source U on the other hand supplies the integration input of the integrator 74 whose output is connected to the integration input of the integrator 75 and on the other hand to a linear matching device 21.

The output of the integrator 75 supplies a linear matching device 22 and a logarithmic matching device 20. The outputs of the networks 20, 21 and 22 are respectively connected to the inputs 60, 61 and 29 of the recorder 9 which on the other hand, at its input 19, receives the signal from the pick-up potentiometer 40.

First of all, the operation of the spectrometer for the recording of a point in the spectrum will be described, leaving aside the automation of the various operations, which can be carried out in various ways, and the reset-to-zero operations.

The time constants of the integrators are selected so that these devices only operate over their linear ranges (in other words so that $e^{-t/RC}$ may be considered as equal to $1-t/RC$), and, in order to simplify the writing, the time constants of the integrators 71 to 75, will respectively be designated by $1/m_1$, $1/m_2 \ldots 1/m_5$.

All the integrators are always reset to zero before being placed in the measurement position.

The channel 10, the first measurement channel will be assumed here to contain the sample.

This being the case, when $v - 13$ has been reset and the mirror 14 is illuminating channel 10, integration of the output signal from the latter is effected by means of the integrator 71, placed in the measurement position, said integrator supplying the adder 81 in the "0" position, and the latter supplying the input of the multivibrator 91 which, at the beginning of the integration operation, is in its "1" state. The integrator 72, supplied with the constant voltage U, is the time-measurement device associated with the channel 10, and is placed in the measurement position at the same time as the integrator 71. The output signal $v$ from the integrator 71, is added to the voltage $-E$ in the adder 81. When the output signal $(v-E)/2$ from the adder departs from the value 0, the multivibrator 91 changes to the "0" state causing programmer 30 to set the integrator 72 to the storage position; the signal stored in said integrator 72, is $m_2 U T_o$.

The integrators 73 and 74 are then simultaneously placed in the measurement position. The output signal from the former is added to the voltage $-E$ in the adder 82, then in the state "0," the multivibrator 92 being in the "1" state. When the output signal from this adder departs from the value 0, at the end of a time $T_2$ which terminates with the changing of the state of the multivibrator 92, there is obtained the relation $$m_3 m_2 U T_o T_2 = E$$

and this gives $T_2 = E/(m_3 m_2 U T_o)$.
The output signal from the integrator 74 is thus:

$$m_4 U T_2 = (m_4 E)/(m_3 m_2 T_o)$$

The integrator 74 is then placed in the storage position and the mirror 24 is set to the channel 11.

The integration of the output signal from the channel 11 takes place in the same manner already described in relation to the output signal from channel 10, with the exception that it is now the integrator 75 which is placed in the measurement position at the same time as the integrator 71. The integrator 75, as supplied with the voltage stored by the integrator 74, is the time-measurement device associated with channel 11.

At the end of the time $T_1$ during which the signal integrated by the integrator 71 reaches the value E, the multivibrator 91 changes from the "1" state to the "0" state.

The output signal from the integrator 75 is then:

$m_5 m_4 E T_1/m_3 m_2 T_o = E_o \cdot T_1/T_o$ where $E_o$ is a constant.

It will be observed that by supplying the integrator 75 with the signal stored in the integrator 74, the integrator 75 produces at the end of the time $T_1$ a signal which is both directly proportional to $T_1$ and inversely proportional to $T_o$.

This signal (proportional to $K_o/K_1$), is applied to the input 29 of the recorder 9 through the linear matching unit 22 for the plotting of the transmission spectrum of channel 10 in relation to channel 11. This signal is also applied to said recorder, to its input 60, through the logarithmic matching device 20 for the plotting not of the transmission spectrum but of the optical density of channel 11 in relation to channel 10. (In order to obtain the optical density spectrum of the sample, it is merely necessary to place the sample in channel 11, channel 10 then doing duty as the reference). Finally, the output signal from the integrator 74 can be supplied to the input 61 of the recorder 9 through the linear matching device 21, in order to give the "single-beam" transmission spectrum of the channel 10.

Figure 3:
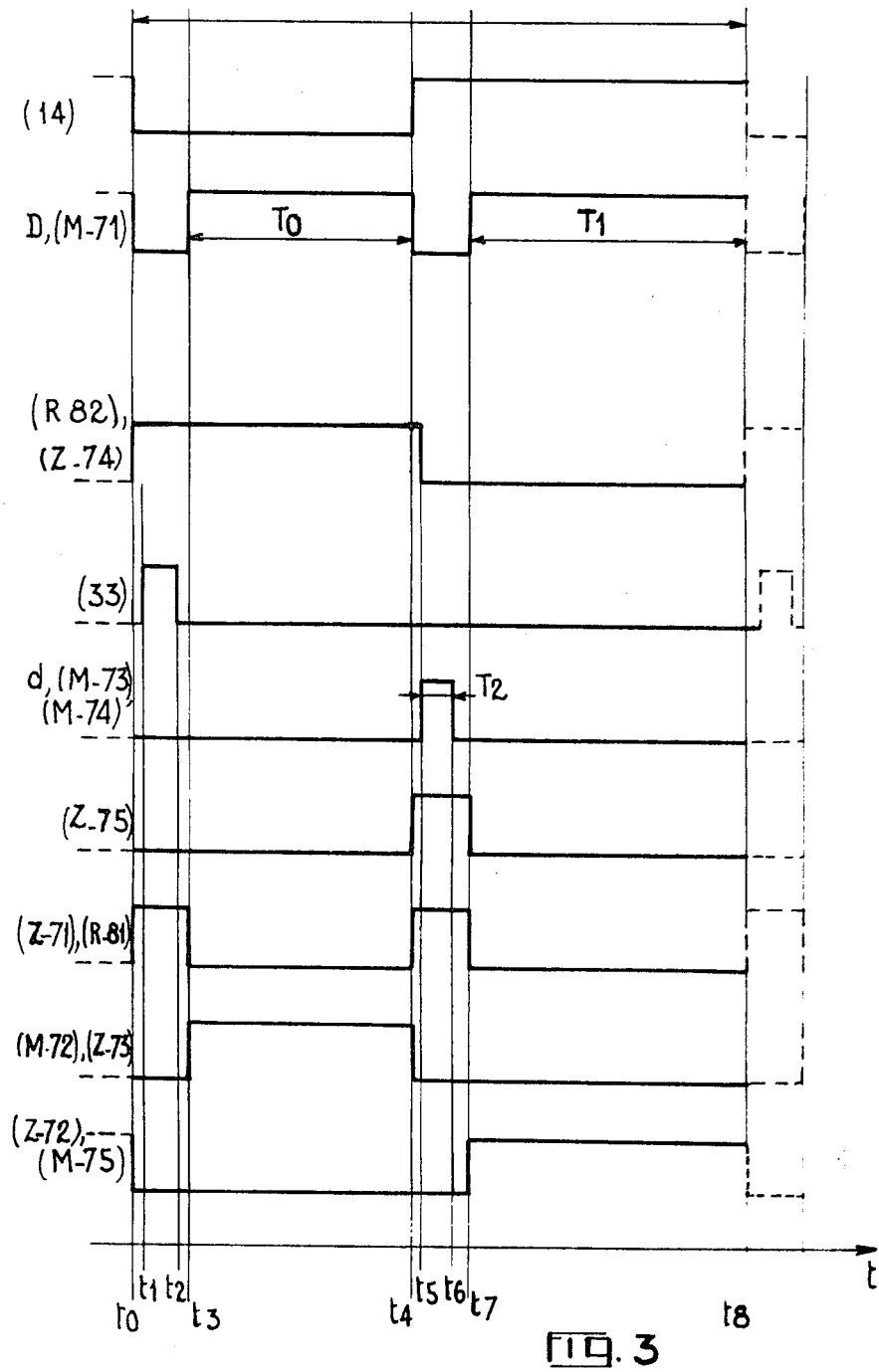
FIG. 3 is a timing diagram relating to the circuits of FIG. 2.

FIG. 3 is a timing diagram illustrating the signals applied to the programmer 30 and the control signals supplied by the latter during a cycle. The automatic unit employs two-level signals "0" and "1" which will be referred to as 0 and 1 whatever their duration.

An integrator is in the measurement position or in the storage position depending upon whether its input M receives a signal 1 or a signal 0, this supposing that its input Z receives a signal 0. It is in the resetting-to-zero state if the input Z receives a signal 1 and its input M a signal 0, and is in fact reset to zero within a negligible zeroing time.

The adders 81 and 82 are in the "0" or "1" state depending upon whether the signal applied to their output has the value 0 or 1.

The mirror 24 is positioned on channel 10 or channel 11 depending upon whether the signal applied to the input 14 has the value 0 or 1.

The grating 13 will pivot one step for a pulse of amplitude 1 and predetermined duration, applied to the input 33.

The inputs M, Z and R will be designated by these same letters followed by a number designating the element to which they belong, and the control signals applied to these inputs will be marked by the same symbols as the inputs to which they are applied, said symbols between brackets. These signals are illustrated in FIG. 3.

They are produced by the programmer 30 through conventional circuits which are supplied with the output signals D and $d$ from the multivibrators 91 and 92, these latter likewise being shown in FIG. 3.

It will now be assumed that a measurement cycle begins at a time $t_o$.

Immediately after the instant $t_o$, the situation is as follows:
The mirror 24 is positioned on channel 10.
The grating 33 still occupies the angular position which it had at the time of recording of the previous point in the spectrum.
The integrators 71 and 74 are in the resetting-to-zero state.
The integrator 72 is at zero in the storage position.
The integrators 73 and 75 are in the storage position, retaining the charge which they had at the end of the measurement position.
The adders 81 and 82 are in the "1" state and the multivibrators 91 and 92 in their "0" state.

$a$, $b$ and $c$ being constant times with $c > a+b$, the following operations now evolve:

Between the instants $t_1 = t_o + a$ and $t_2 = t_1 + b$, a pulse of amplitude 1, is applied to the input 33 in order to cause the angular position of the grating 13 to shift one step, this input 33 receiving a signal of amplitude 0 during all the other fractions of a cycle. At the instant $t_3 = t_o + c$, the integrators 71 and 72 are placed in the measurement position and the adder 81 in the "0" state, the multivibrator 91 then passing to the "1" state and the integrator 73 being placed to the resetting-to-zero state; however, the multivibrator 92 remains in the "0" state because of the fact that the adder 82 is still in the "1" state.

At the instant $t_4 = t_3 + T_o$, marked by the triggering of the multivibrator 91 into its "0" state and a corresponding transition in the D signal, the signal 14 reverts to the value 1 and, consequently, the mirror 24 is positioned on channel 11, the integrator 72 is set to the storage position, the integrators 71 and 75 are placed in the resetting-to-zero state, and the adder 81 is set to the 1 state, this latter operation maintaining the multivibrator 91 in its "0" state.

At the instant $t_5 = t_4 + a$, the integrators 73 and 74 are placed in the measurement position and the adder 82 in the "0" state, causing the multivibrator 92 to convert to its "1" state.

The instant $t_6 = t_5 + T_2$ is defined by the changing of the multivibrator 92 to the "0" state, plus a corresponding transition in the $d$ signal. The integrators 73 and 74 are placed in the storage position, the integrator 73 thus maintaining the multivibrator 92 in the "0" state.

The instant $t_7$ coincides with $t_6$ if the condition $t_5 + T_2 > t_4 + c$ is satisfied, and with $t_4 + c$ in the reverse case (case shown in the Figure).

At this instant $t_7$, the integrators 71 and 75 are placed in the measurement position, the adder 81 in the zero state, causing the multivibrator 91 to convert to its "1" state, and the integrator 72 is placed in the resetting-to-zero state.

The instant $t_8 = t_7 + T_1$ is marked by the triggering of the multivibrator 91 and a fresh transition from 1 to 0 in the signal D. The signal 14 reverts to zero again, thus causing the mirror 24 to be positioned on the channel 10, the integrator 71 being placed in the resetting-to-zero state whilst the adder 81 is placed in the "1" state, the multivibrator 91 being thus maintained in its "0" state.

The integrator 75 is placed in the storage position for the recording (double beam fashion), of the points in the spectrum corresponding to the cycle which has just been completed, whilst the integrator 74 is placed in the resetting-to-zero state and the integrator 72, previously discharged, is placed in the storage position. The adder 82 is placed in the "1" state.

With the commencement of a new cycle, the conditions indicated hereinbefore are thus encountered again.

In this example, the three traces plotted in the recorder 9, will drop to zero with their input signals.

The control signals required, can easily be produced in a closed cycle by the programmer 30 using the output signals D and $d$ from the trigger stages 91 and 92:

At the beginning of a cycle, from $t_o$ to $t_3$ inclusive, the operations are strictly predetermined, the instants $t_1$, $t_2$ and $t_3$ being defined as follows:

$$t_1 = t_o + a$$
$$t_2 = t_1 + b$$
$$t_3 = t_o + c$$

This being the case, $t_4$ is determined by the first transition from 1 to 0 in the output signal D from the multivibrator 91; $t_5$ is then defined by $t_5 = t_4 + a$.

$t_6$ is defined by a transition from 1 to 0 in the output signal $d$ from the multivibrator 92.

$t_7$ is defined $t_7 = t_6$ if $t_4 + o < t_6$, and by $t_4 + c$ in the reverse case (case shown in FIG. 3).

$t_8$ is defined by the second transition from 1 to 0 in the signal D, the instant $t_o$ in the following cycle coinciding with the instant $t_8$ in the preceding cycle.

It will be observed that the signal D is identical to the signal (M-71), and the signal $d$ to the signal (M-73) and (M-74).

It will be observed too, that the time interval "a" between $t_o$ and $t_1$, makes it possible to recognize the amplitude of the signal 14 if it is desired to form the signal 33 from said signal 14, and that the time interval $c$ elapsing between $t_o$ and $t_3$, and the minimum interval between $t_4$ and $t_7$, correspond to a delay which is necessitated by the optical switching function and also, in the first case, by the rotation of the grating.

FIG. 4 illustrates a simplified variant embodiment of the spectrometer; $T_o$ is made constant so that E consequently has a variable value.

The unit 100, its inputs and its outputs, have the same significance as before, and the same applies to the unit 40.

The circuit comprises three integrators 76, 77 and 78 of the same type as the integrators 71 to 75 of FIG. 2.

A switch 110 provided with a control input I makes it possible to couple to the output of the device 100 either, in its "0" state, the integration input of the integrator 77, or, in its "1" state, the integration input of the integrator 76.

The output of the integrator 77 is connected to the input of a polarity-inverter 101.

A second switch 111, provided with a control input I, couples to the second input of an adder 83, either, in its "0" state, the output of the polarity inverter 101, or, in its "1" state, a point W which is at a positive constant potential.

The adder 83 is supplied at its first input with the output signal from the integrator 76.

The output of the adder 83 is connected to the control input of a bistable multivibrator 93 which is placed in its "1" state, presuming that it did not already occupy same, by a sufficiently negative threshold voltage, and in its "0" state, by a zero or positive voltage.

A fixed voltage U supplies the integration input of the integrator 78 whose output is connected through a logarithmic matching arrangement 120 to the input 129 of a recorder 109.

The input 119 of the latter is connected to the output of the pick-up potentiometer 40.

The output of the multivibrator 93 supplies the input 131 of a programmer 130 which supplies at its outputs 163 control signals which are applied to the inputs 14, 33, M and Z of the integrators and the inputs I of the switches.

A cycle corresponding to the recording of a point in the transmission spectrum, evolves as follows, it being understood that all the integrators are reset to zero before being placed in the measurement position.

The mirror 24 is positioned on the channel 10 which is the first measurement channel and is now the reference channel; the angular position of the grating 13 is stepped on one step, the switch 110 couples the integrator 77 to the output of the device 100, and said integrator 77 is placed in the measurement position for the fixed time $T_o$, at the end of which the integrated signal reaches a variable value E. During the course of this measurement, the switch 111 is in the "1" state so as to maintain the multivibrator 93 in its "0" state.

At the end of the time $T_o$, the integrator 77 is placed in the storage position.

The mirror 24 is then positioned on the channel 11 and the integrators 76 and 78 are simultaneously placed in the measurement position and the switch 111 in the "0" state, causing the multivibrator 93 to change to its "1" state. The integrator 78, supplied with the constant voltage U, constitutes the time measurement device in the circuit.

At the end of the time $T_1$ such that the signal integrated by the integrator 76 has reached the value E stored in the integrator 77, the multivibrator 93 changes to its "0" state. This causes the integrator 78 to be placed in the storage position.

The stored signal in the integrator 78 is $U m_8 T_1$, its time constant being defined as $1/m_8$.

The logarithmic matching unit 120 enables the recorder 109 to be supplied with a signal representative of the optical density of the sample.

The "1" position on the part of the switch 111, enables the multivibrator 93 to be maintained in its "0" state outside the time intervals $T_o$.

Consequently, the multivibrator 93 does not change from its "1" state to its "0" state until the signal integrated by the integrator 76 reaches the value E.

If $t_j$ is the instant at which the integrators 76 and 78 are placed in the measurement position, and $t_{j+1}$ the instant at which the multivibrator 93 changes from the 1 to the 0 state, thus marking the end of a cycle, the operations occurring between $t_o$ and $t_j$ inclusive can be carried out in accordance with a programme the characteristic instants in which are separated from $t_o$ by predetermined intervals, the $t_o$ of a cycle furthermore coinciding with the instant $t_{j+1}$ of the preceding cycle.

The sole information required by the programmer 30 is thus that which is supplied by the output of the multivibrator 93.

Delay factors of the same kind as those already referred to in relation to the spectrometer of FIG. 2, will have to be taken account of here as well.

Self-evidently, the invention is in no way limited to the embodiments described and illustrated here.

It is possible, for example, to use as a two-position time-measurement device, a counter supplied by a clock, the clock possibly being common to two time-measurement devices. In the case, for example, where E = constant, these two devices produce two numbers $N_1$ and $N_0$ which are respectively proportional to $T_1$ and $T_0$ and it is easy to divide one by the other using a computer and to convert the quotient into an analogue signal using a digital-to-analogue converter.

On the other hand, in the device of FIG. 4, it will be possible to use a single integrator instead of the integrators 76 and 77, the reference channel charging the integrator and the sample channel discharging it if a switch is provided by which to connect the output of the device 100 alternatively directly or through a polarity-inverter, to the input of said integrator.

Instead of using a polarity-inversion system preceding said integrator, an identical result could be obtained by switching the polarity of the reference signal applied to the synchronous detector of the spectrometer, depending upon which of the two channels is supplying the optico-electrical detector.

What is claimed is:

1. An infra-red spectrometer comprising: a source of radiation for supplying a beam; an optico-electrical receiver having an output, for supplying an electrical signal which is a function of the intensity of the radiation received by said receiver; a sample channel for receiving a sample and a reference channel; optical switching means, having two states, for optically coupling, selectively through said sample channel or through said reference channel, said source to said receiver; a wavelength selector located for operating a wavelength selection on the beam directed from said source to said receiver for both states of said switching means; measurement means for successively (i) setting said optical switching means to one of its states referred to as its first state, for coupling said source to said receiver through one of said channels, referred to as the first measurement channel; (ii) integrating the output signal from said receiver for a duration $T_0$ at the end of which the integrated signal reaches a value E, one of the two quantifies $T_0$ and E being predetermined, and generating and storing a signal representative of the other one of said two quantities; (iii) setting said optical switching means to its other state, referred to as its second state, for coupling said source to said receiver through the other one of said channels, referred to as the second measurement channel, and (iiii) integrating the output signal from said receiver for the duration $T_1$ at the end of which the corresponding integrated signal has reached said value E, and generating a signal proportional to said duration $T_1$; a recorder having first and second inputs; means for applying to said first input of said recorder a signal which is a function of the wavelength selected by said wavelength selector; and further means coupled to said measurement means, for supplying said second input of said recorder with a signal which is a predetermined function of the ratio $T_1/T_0$.

2. A spectrometer as claimed in claim 1, wherein, E being the predetermined quantity, said measurement means comprises a two-position integrator having an integration input coupled to the output of said receiver, said integrator having a measurement position in which it integrates the signal applied to its integration input and a storage position; first and second two-position time-measuring devices, respectively associated with said first and second measurement channels, each of said time-measurement devices having a measurement position in which it delivers an electrical signal which is a function of the time elapsed since it was placed in this position and a storage position; means for simultaneously placing in the measurement position said integrator and said first time-measurement device, and for placing said last-mentioned device in the storage position when the output signal from said integrator has reached said value E; means for resetting to zero said integrator; means for simultaneously placing in the measurement position said integrator and said second time-measurement device, and placing said latter device in the storage position when the output signal from said integrator has reached said value E.

3. A spectrometer as claimed in claim 2, wherein each of said two time-measurement devices is constituted by a two-position integrator having an integration input and having a measurement position in which it integrates the signal applied to its integration input and a storage position and means for supplying said input of this integrator with a constant voltage while it is in the measurement position.

4. An infra-red spectrometer, as claimed in claim 3, wherein said means for supplying the integration input of the integrator forming part of said second time-measurement device comprises: a constant voltage source; first and second further two-position integrators, said further integrators having respective integration inputs and respective outputs, each of said further two-position integrators having a measurement position in which it integrates the signal applied to its integration input and a storage position, said integration input of said first further integrator being coupled to said output of said integrator forming part of said first time-measurement device, said integration input of said second further integrator being coupled to said constant voltage source, and said output of said second further integrator being coupled to the integration input of said integrator forming part of said second time-measurement device; means for simultaneously placing in the measurement position said first and second further integrators while said first time-measurement device is in the storage position; and means for placing said second further integrator in the storage position when the integrated signal from said first further integrator has reached a predetermined value, for supplying said integration input of said integrator forming part of said second time-measurement device when the latter is in the measurement position; whereby this last mentioned device directly supplies a signal proportional to $T_1/T_0$.

5. An infra-red spectrometer as claimed in claim 1, wherein, $T_0$ being the predetermined quantity, said measurement means comprises: first and second two-position integrators having respective integration inputs, each of said integrators having a measurement position in which it integrates the signal applied to its integration input and a storage position; a switch for coupling said output of said receiver selectively to said integration input of said first integrator or to said integration input of said second integrator; a two-position time measurement device having a measurement position in which it delivers an electrical signal which is a function of the time elapsed since it was placed in this position and a storage position; means for setting said first integrator to its measurement position for a predetermined duration $T_0$, and thereafter to its storage position; means for simultaneously setting said second integrator and said time measurement device to their respective measurement positions and means for setting said time measurement device to its storage position upon the output signal of said second integrator reaching the value stored in said first integrator.

* * * * *